(12) United States Patent
Hayashi (10) Patent No.: US 10,654,379 B2
(45) Date of Patent: May 19, 2020

(54) VEHICLE SEAT SLIDING DEVICE (71) Applicant: SHIROKI CORPORATION, Fujisawa-shi (JP)

(72) Inventor: Naoki Hayashi, Fujisawa (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 163 days.

(21) Appl. No.: 15/735,918

(22) PCT Filed: Jun. 16, 2016

(86) PCT No.: PCT/JP2016/068014
§ 371 (c)(1),
(2) Date: Dec. 12, 2017

(87) PCT Pub. No.: WO2016/208496
PCT Pub. Date: Dec. 29, 2016

(65) Prior Publication Data
US 2019/0001843 A1    Jan. 3, 2019

(30) Foreign Application Priority Data
Jun. 24, 2015   (JP) ................................ 2015-126599

(51) Int. Cl.
F16M 13/00 (2006.01)
B60N 2/08 (2006.01)
B60N 2/07 (2006.01)

(52) U.S. Cl.
CPC ......... *B60N 2/0818* (2013.01); *B60N 2/0705* (2013.01); *B60N 2/085* (2013.01); *B60N 2/0806* (2013.01); *B60N 2/0875* (2013.01)

(58) Field of Classification Search
CPC .... B60N 2/0818; B60N 2/0705; B60N 2/085; B60N 2/0875
(Continued)

(56) References Cited

U.S. PATENT DOCUMENTS

2011/0163217 A1   7/2011 Kimura et al.
2015/0306981 A1 * 10/2015 Arakawa ............. B60N 2/0705
                                                    248/429
2016/0221476 A1   8/2016 Satoh et al.

FOREIGN PATENT DOCUMENTS

JP    2009-227259 A   10/2009
JP    2010-195376 A    9/2010
(Continued)

OTHER PUBLICATIONS

International Preliminary Report on Patentability (PCT Form PCT/IB/373), in PCT/JP2016/068014, dated Dec. 26, 2017.
(Continued)

*Primary Examiner* — Gwendolyn W Baxter
(74) *Attorney, Agent, or Firm* — McGinn IP Law Group, PLLC.

(57) ABSTRACT

A vehicle seat sliding device includes a lower rail, an upper rail, a lock lever, a spring, and an operation handle. A first through hole and a second through hole which are separated from each other in a longitudinal direction of the upper rail are formed in the upper rail. The lock lever further has a first engaging part which abuts on an inner wall surface of the first through hole and a second engaging part which abuts on an inner wall surface of the second through hole. At least while the lock lever is rotated by the operation handle, the first engaging part is engaged by the first through hole, and the second engaging part is engaged by the second through hole.

6 Claims, 6 Drawing Sheets (58) Field of Classification Search
USPC .......................................................... 248/429
See application file for complete search history.

(56) References Cited

FOREIGN PATENT DOCUMENTS

| | | |
|---|---|---|
| JP | 2012-158201 A | 8/2012 |
| JP | 2015-083422 A | 4/2015 |

OTHER PUBLICATIONS

Translation of Written Opinion of the International Searching Authority (PCT Form PCT/ISA/237), in PCT/JP2016/068014 dated Sep. 6, 2016.
International Search Report (ISR) (PCT Form PCT/ISA/210), in PCT/JP2016/068014, dated Sep. 6, 2016.
(PCT Form PCT/ISA/237), in PCT/JP2016/068014, dated Sep. 6, 2016.

* cited by examiner

VEHICLE SEAT SLIDING DEVICE

TECHNICAL FIELD

The present invention relates to a vehicle seat sliding device.

BACKGROUND ART

A vehicle seat device is known which includes a seat rail and a slide rail (for example, see Patent Literature 1). In the vehicle seat device disclosed in Patent Literature 1, the seat rail is slidable with respect to the slide rail fixed to a floor of a vehicle body and is locked in the slide rail by a slide lock mechanism. The lock mechanism includes a lock plate which can be engaged with the seat rail, a hinge pin which supports the lock plate rotatably, and a spring which biases the lock plate in a locking direction.

CITATION LIST

Patent Literature

[Patent Literature 1]: Japanese Unexamined Patent Application Publication No. 2012-158201

SUMMARY OF THE INVENTION

Technical Problem

However, in a vehicle slide seat device disclosed in Patent Literature 1, the hinge pin for rotatably supporting the lock plate is necessarily provided additionally to configure the slide lock mechanism. Thus, the number of the components necessary for making the vehicle seat device is increased.

An object of the invention is to provide a vehicle seat sliding device, in which the number of components is reduced.

Solution to Problem

A vehicle seat sliding device according to one aspect of the invention includes a lower rail, which is fixed to a vehicle body and has an engaging protrusion part; an upper rail, which is supported to be slidable with respect to the lower rail and is fixed to a seat; a lock lever, which has a locking part configured to be engaged with the engaging protrusion part and locks the upper rail in the lower rail in a state where the locking part is engaged with the engaging protrusion part; a biasing member, which is supported by the upper rail and biases the lock lever; and an operation handle, which is configured such that the lock lever is rotated to release engagement between the locking part and the engaging protrusion part, wherein a first through hole and a second through hole, which are separated from each other in a longitudinal direction of the upper rail, are formed in the upper rail, wherein the lock lever further has a first engaging part, which abuts on an inner wall surface of the first through hole, and a second engaging part, which abuts on an inner wall surface of the second through hole, and wherein at least while the lock lever is being rotated by the operation handle, the first engaging part is engaged by the first through hole, and the second engaging part is engaged by the second through hole.

According to the above-described configuration, while the lock lever is being rotated by the operation handle, the first engaging part is engaged by the first through hole, and the second engaging part is engaged by the second through hole. Thus, the lock lever is rotated in the state of being supported by the first and second through holes of the upper rail, and thus it is prevented that a rotational shaft of the lock lever is deviated largely during the rotation of the lock lever. Accordingly, it is not necessary to additionally provide a hinge pin and the like for rotatably supporting the lock lever in the slide device. Therefore, it is possible to reduce the number of the components necessary for the slide device. Further, when the number of the components is reduced as above, a producing process required for the production of the slide device can be reduced, and the producing cost of the slide device can be reduced.

According to another aspect of the invention, at least in a state where the locking part is engaged with the engaging protrusion part, the biasing member biases the first engaging part downward such that the first engaging part abuts on the inner wall surface of the first through hole, and biases the second engaging part upward such that the second engaging part abuts on the inner wall surface of the second through hole.

According to the above-described configuration, in a state where the locking part is engaged with the engaging protrusion part (in other words, in a state where the upper rail is locked in the lower rail), the biasing member biases the first engaging part downward such that the first engaging part abuts on the inner wall surface of the first through hole, and biases the second engaging part to the upper side which is an inverse direction to the lower side such that the second engaging part abuts on the inner wall surface of the second through hole. Thus, it is possible to suppress a backlash in the vertical direction of the lock lever in the state where the upper rail is locked in the lower rail. Further, the first engaging part is biased downward, and the second engaging part is biased upward. Therefore, the lock lever can be rotated smoothly.

According to still another aspect of the invention, the biasing member is formed by a single spring.

According to the above-described configuration, the biasing member is formed by a single spring. Therefore, it is possible to further reduce the number of the components necessary for the slide device.

According to still another aspect of the invention, the biasing member supports the operation handle so as to bias the operation handle.

According to the above-described configuration, the biasing member supports the operation handle so as to bias the operation handle. Therefore, it is possible to suppress a backlash in the vertical direction of the operation handle in the state where the upper rail is locked in the lower rail. Further, since the operation handle and the lock lever can be biased by a single spring, it is possible to further reduce the number of the components necessary for the slide device.

According to still another aspect of the invention, at least one of the first through hole and the second through hole is a taper hole which has a tilted inner wall surface tilted with respect to a vertical direction orthogonal to the longitudinal direction.

According to the above-described configuration, at least one of the first through hole and the second through hole is a taper hole. Therefore, it is possible to suppress that a backlash in the longitudinal direction of the lock lever.

According to still another aspect of the invention, a position of a lower surface of the first engaging part in a vertical direction orthogonal to the longitudinal direction of the upper rail is the same as a position of an upper surface of the second engaging part.

According to the above-described configuration, the position of the lower surface of the first engaging part in the vertical direction of the upper rail is substantially the same as the position of the upper surface of the second engaging part. Therefore, the rotational shaft of the lock lever is substantially parallel to the longitudinal direction of the lock lever. Thus, it is possible to rotate the lock lever smoothly.

According to still another aspect of the invention, the lock lever further has a first protrusion part, which is formed in a vicinity of the first engaging part and abuts on the upper rail, and a second protrusion part, which is formed in a vicinity of the second engaging part and abuts on the upper rail.

According to the above-described configuration, the lock lever has the first and second protrusion parts which abut on the upper rail. Therefore, it is possible to suppress a backlash in a width direction of the lock lever in the state where the upper rail is locked in the lower rail.

Advantageous Effects of the Invention

According to the invention, the vehicle seat sliding device can be provided in which the number of the components is reduced.

DESCRIPTION OF EMBODIMENTS

Hereinafter, one embodiment of the invention (hereinafter, simply referred to as this embodiment) will be described with reference to the drawings. Further, members having the same reference numerals as those already described in the description of the present embodiment are omitted for the sake of convenience of description. In addition, the dimensions of the members illustrated in the drawings may be different from actual dimensions of the members for convenience of description.

Figure 1:
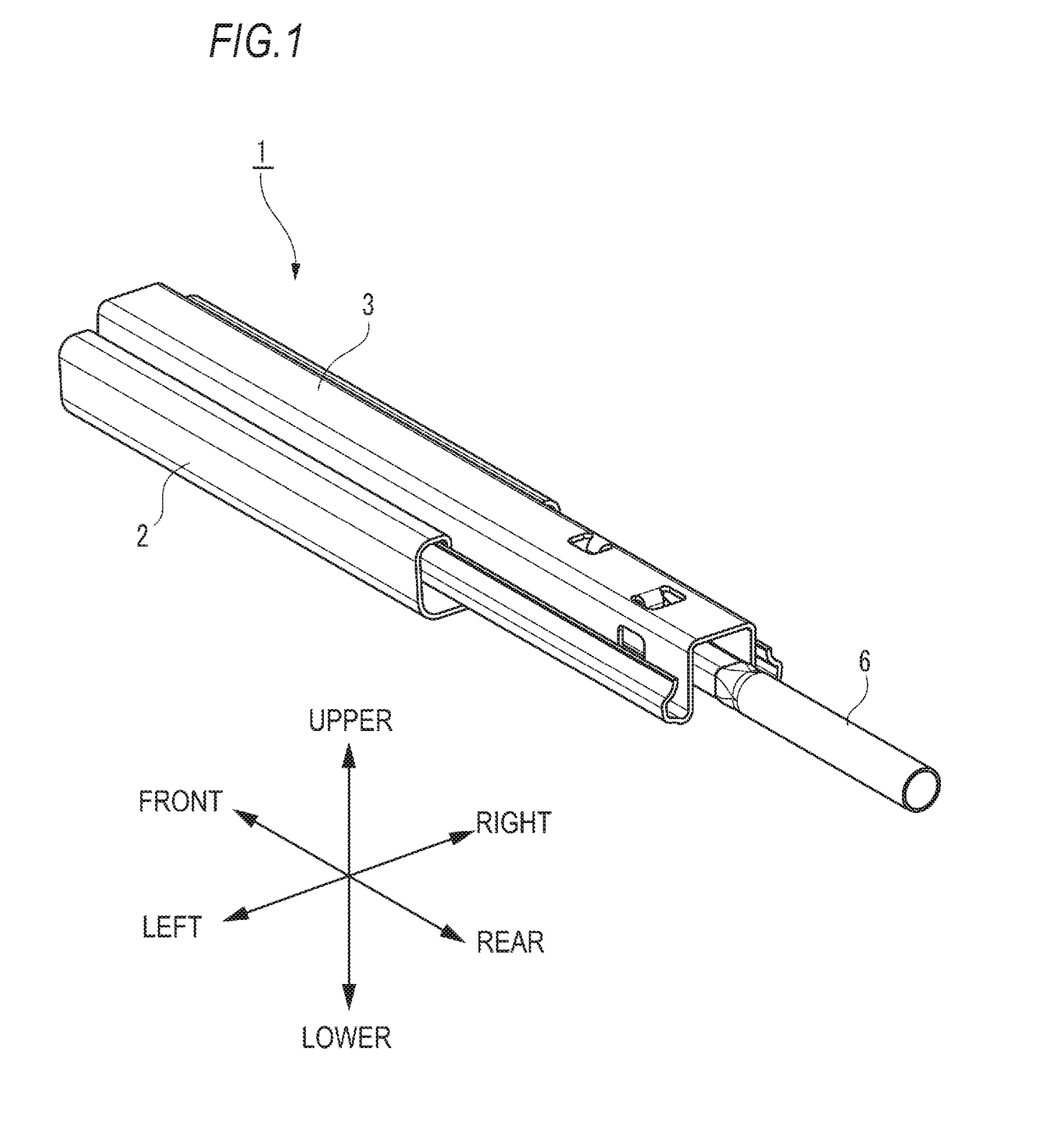
FIG. 1 is an appearance view illustrating a vehicle seat sliding device according to an embodiment of the invention.

A "right and left direction", a "front and rear direction", and a "vertical direction" are referred to as appropriate in the description of this embodiment for the sake of convenience. These directions are relative directions which are set with respect to a vehicle seat sliding device 1 (hereinafter, simply referred to as a slide device 1) illustrated in FIG. 1. For this reason, it is necessarily noted that the rotation in these directions is also performed in a case where the slide device 1 illustrated in FIG. 1 is rotated in a predetermined direction. Herein, the "vertical direction" indicates a direction including an "upper direction" and a "lower direction". The "front and rear direction" indicates a direction including a "front direction" and a "rear direction". The "right and left direction" indicates a direction including a "left direction" and a "right direction".

Figure 2:
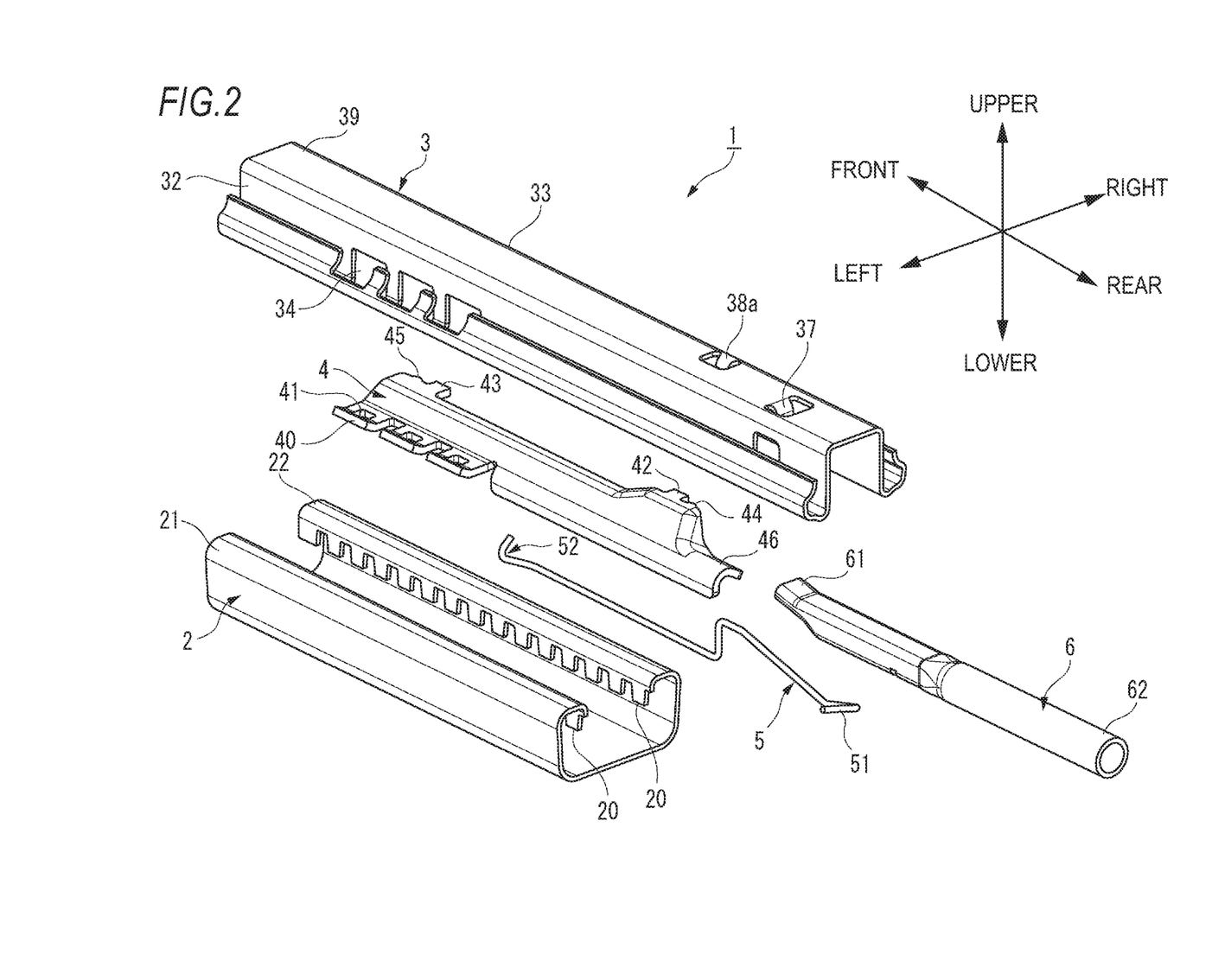
FIG. 2 is an exploded perspective view illustrating the vehicle seat sliding device according to the embodiment of the invention.
Figure 3:
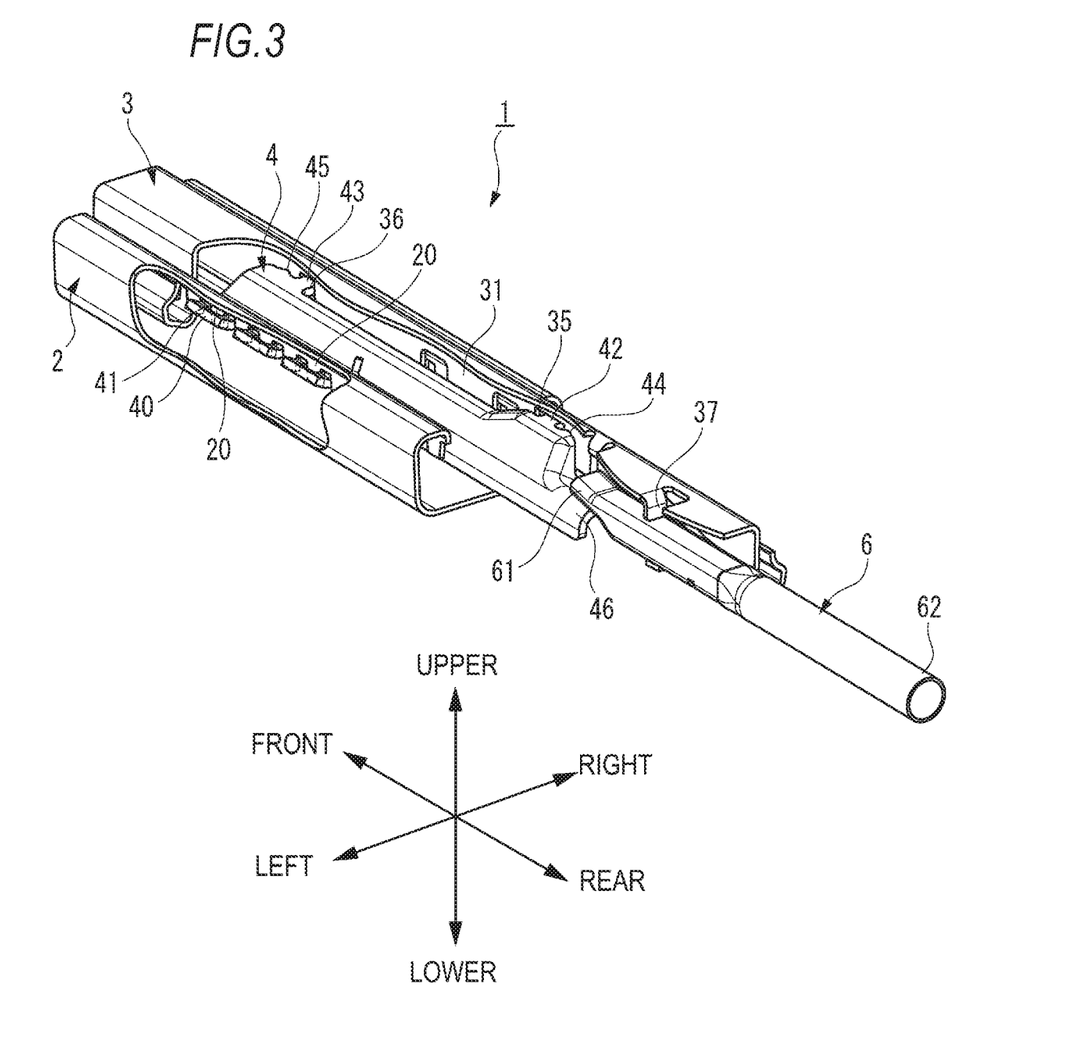
FIG. 3 is a cutaway view illustrating the vehicle seat sliding device according to the embodiment of the invention.
Figures 4A, 4B:
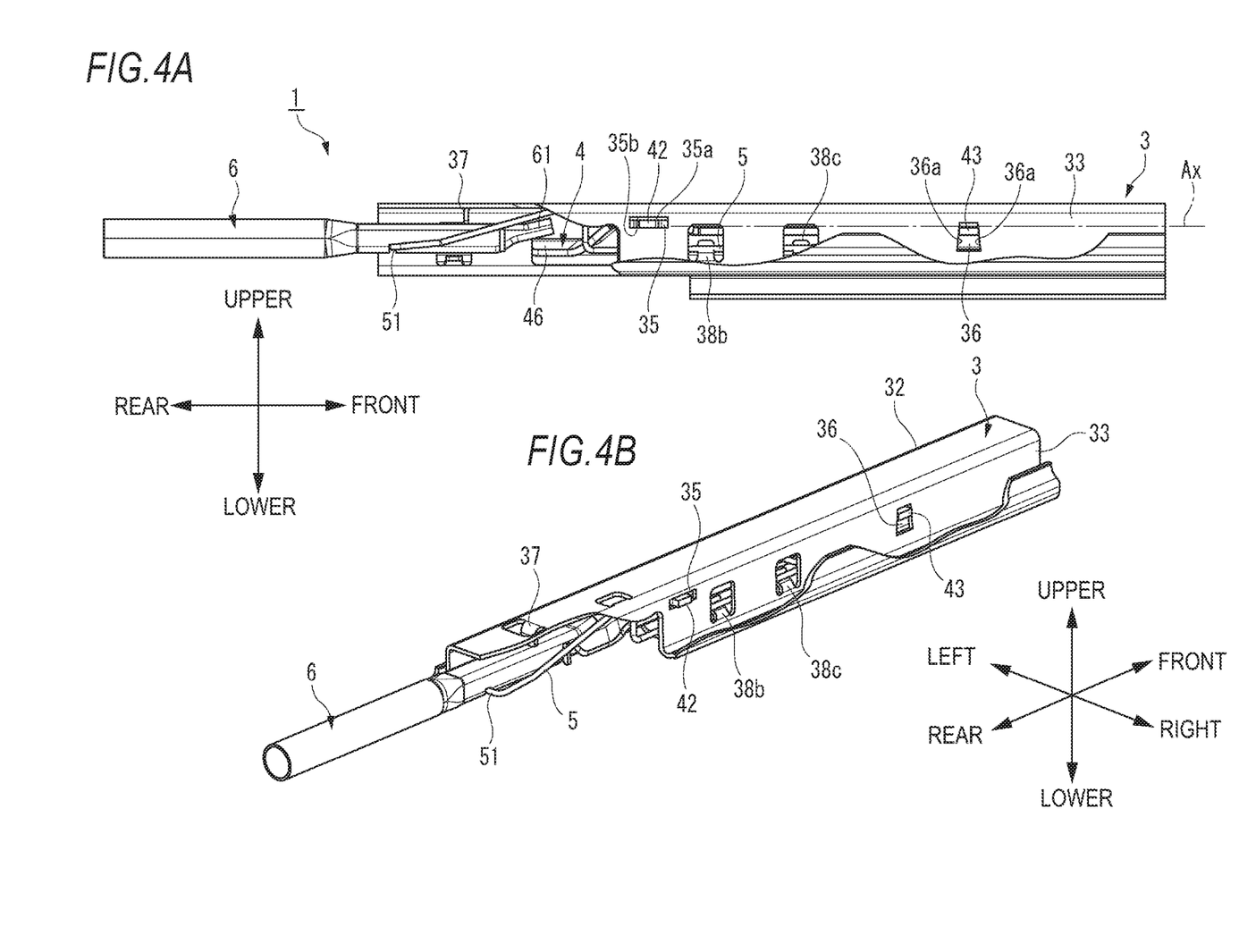
FIG. 4A is a right side view of the vehicle seat sliding device according to the embodiment of the invention.
FIG. 4B is a perspective view of the vehicle seat sliding device according to the embodiment of the invention when viewed from a right rear side.
Figure 5:
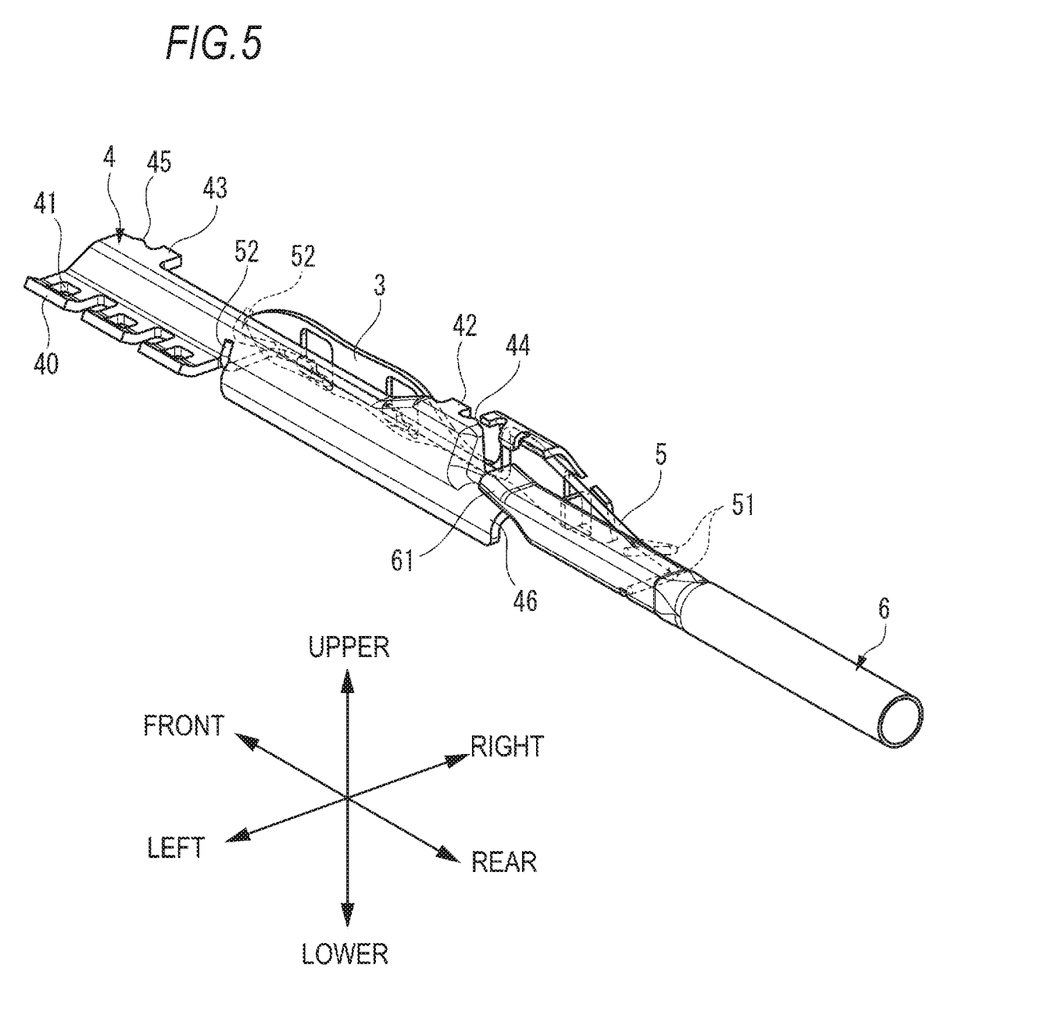
FIG. 5 is a view mainly illustrating a lock lever and an operation handle which are supported by a spring.

The configuration of the slide device 1 according to this embodiment will be described below with reference to FIGS. 1 to 5. FIG. 1 is an appearance view illustrating the slide device 1. FIG. 2 is an exploded perspective view illustrating the slide device 1. FIG. 3 is a cutaway view illustrating the slide device 1. FIG. 4A is a right side view of the slide device 1, and FIG. 4B is a perspective view of the slide device 1 when viewed from the right and rear side. FIG. 5 is a view mainly illustrating a lock lever 4 and an operation handle 6 which are supported by a spring 5. As illustrated in FIG. 2, the slide device 1 includes a lower rail 2, an upper rail 3, the lock lever 4, the spring (biasing member) 5, and the operation handle 6.

The lower rail 2 is fixed to a floor of the vehicle body, for example, and extends in the front and rear direction. The lower rail 2 has a plurality of engaging protrusion parts 20 formed in a comb shape. The plurality of engaging protrusion parts 20 are arranged side by side to be separated from each other in the front and rear direction. The plurality of engaging protrusion parts 20 are provided on both sides of a left guide part 21 and a right guide part 22 of the lower rail 2.

The upper rail 3 is fixed to the vehicle seat and extends in the front and rear direction. The upper rail 3 is supported by the lower rail 2 to be slidable with respect to the lower rail 2. The upper rail 3 has a left side surface 32 extending in the front and rear direction, a right side surface 33 which is positioned on the opposite side to the left side surface 32, and an upper surface 39 which is positioned between the left side surface 32 and the right side surface 33. In the left side surface 32, a plurality of insertion holes 34 are formed side by side in the front and rear direction. In the right side surface 33, a first through hole 35 and a second through hole 36 are formed which are separated from each other in the front and rear direction (the longitudinal direction of the upper rail 3) (see FIGS. 4A and 4B). The first through hole 35 is formed in a rectangular shape, and has an opening area larger than the sectional area, which is orthogonal to the right and left direction, of a first engaging part 42 (to be illustrated). The second through hole 36 is formed in a taper hole which has a pair of tilted inner wall surfaces 36a tilted with respect to the vertical direction. Particularly, the taper hole is formed such that an opening width in the front and rear direction gradually becomes smaller toward the upper direction.

As illustrated in FIGS. 4A and 4B, spring support parts 38b and 38c supporting the spring 5 are formed in the right side surface 33 of the upper rail 3. As illustrated in FIG. 2, a handle abutting part 37 which abuts on the operation handle 6 and a spring support part 38a which supports the spring 5 are formed in the upper surface 39.

The lock lever 4 is provided in the upper rail 3, and is configured such that the upper rail 3 is locked in the lower rail 2. Herein, the locking indicates to limit the movement of the upper rail 3 with respect to the lower rail 2 in the front and rear direction. The lock lever 4 has a plurality of locking parts 40, the first engaging part 42, a second engaging part 43, a first protrusion part 44, and a second protrusion part 45.

As illustrated in FIGS. 2 and 3, in a state where the lock lever 4 is provided in the upper rail 3, the locking part 40 provided in the left side end part of the lock lever 4 is inserted into the corresponding insertion hole 34, and protrudes from the left side surface 32 of the upper rail 3. In addition, in a state where a force in the upper direction does not act on a rear end part 62 of the operation handle 6, one among the plurality of engaging protrusion parts 20 of the lower rail 2 is inserted into an insertion hole 41 formed in each of the locking part 40. Thus, each of the locking parts 40 is engaged with one of the plurality of engaging protrusion parts 20, and the lock lever 4 locks the upper rail 3 in the lower rail 2.

The first engaging part 42 and the second engaging part 43 are provided in the right side end part of the lock lever 4. As illustrated in FIG. 3, the first engaging part 42 is inserted into the first through hole 35 formed in the right side surface 33 of the upper rail 3, and protrudes from the right side surface 33 to the right side. Similarly, the second engaging part 43 is inserted into the second through hole 36 formed in the right side surface 33, and protrudes from the right side surface 33 to the right side.

The first protrusion part 44 is formed in the vicinity of the first engaging part 42. In addition, the second protrusion part 45 is formed in the vicinity of the second engaging part 43. As illustrated in FIG. 3, in a state where the lock lever 4 is provided in the upper rail 3, the first protrusion part 44 and the second protrusion part 45 abut on the inner wall surface 31 of the upper rail 3. Thus, the lock lever 4 has the first protrusion part 44 and the second protrusion part 45 which abut on the inner wall surface 31 of the upper rail 3, and thus as illustrated in FIG. 3, it is possible to suppress a backlash in the right and left direction (width direction) of the lock lever 4 in a state where the upper rail 3 is locked in the lower rail 2 (hereinafter, referred to as a locked state).

The operation handle 6 is configured such that the engagement between the locking part 40 and the engaging protrusion part 20 is released by rotating the lock lever 4 such that the locking part 40 moves downward.

The spring 5 is provided in the upper rail 3, and is supported by the spring support parts 38a to 38c of the upper rail 3. The spring 5 is formed by a single member, and has a rear end part 51 and a front end part 52. The rear end part 51 of the spring 5 supports the operation handle 6 to bias the operation handle 6 upward. The front end part 52 of the spring 5 supports the lock lever 4 to bias the lock lever 4 upward and rightward. Further, in this embodiment, the spring 5 is formed by a single member. However, the spring 5 may be formed by a plurality of separate members.

As illustrated in FIG. 5, in a state where the spring 5 supports the lock lever 4 and the operation handle 6, the spring 5 is elastically deformed compared to a natural state illustrated in FIG. 2. For this reason, in a state where the spring 5 supports the lock lever 4 and the operation handle 6, the rear end part 51 of the spring 5 biases the operation handle 6 upward, and the front end part 52 of the spring 5 biases the lock lever 4 upward and rightward.

In this embodiment, the operation handle 6 is supported such that the rear end part 51 of the spring 5 biases the operation handle 6 upward, and thus it is possible to suppress a backlash in the vertical direction of the operation handle 6 in the locked state. Further, the operation handle 6 and the lock lever 4 can be biased by the spring 5 formed by a single member, and thus it is possible to reduce the number of the components necessary for the slide device 1. Further, the front end part 52 of the spring 5 biases the lock lever 4 rightward, and thus as described above, the first protrusion part 44 and the second protrusion part 45 abut on the inner wall surface 31 of the upper rail 3.

The front end part 52 of the spring 5 biases the lock lever 4 upward. Thus, as illustrated in FIGS. 4A and 4B, in the locked state, the spring 5 biases the first engaging part 42 downward such that the first engaging part 42 abuts on a lower inner wall surface 35a of the first through hole 35. In addition, the spring 5 biases the second engaging part 43 to the upper side which is an inverse direction to the lower side such that the second engaging part 43 abuts on the tilted inner wall surface 36a of the second through hole 36. Thus, it is possible to suppress a backlash in the vertical direction of the lock lever 4 in the locked state.

Since the second through hole 36 is formed as a taper hole, the second engaging part 43 abuts on the pair of tilted inner wall surfaces 36a of the second through hole 36. For this reason, it is possible to suppress the backlash in the front and rear direction (longitudinal direction) of the lock lever 4. Further, in this embodiment, only the second through hole 36 is formed as a taper hole. However, both of the first through hole 35 and the second through hole 36 may be formed as a taper hole, or only the first through hole 35 may be formed as a taper hole.

Figure 6:
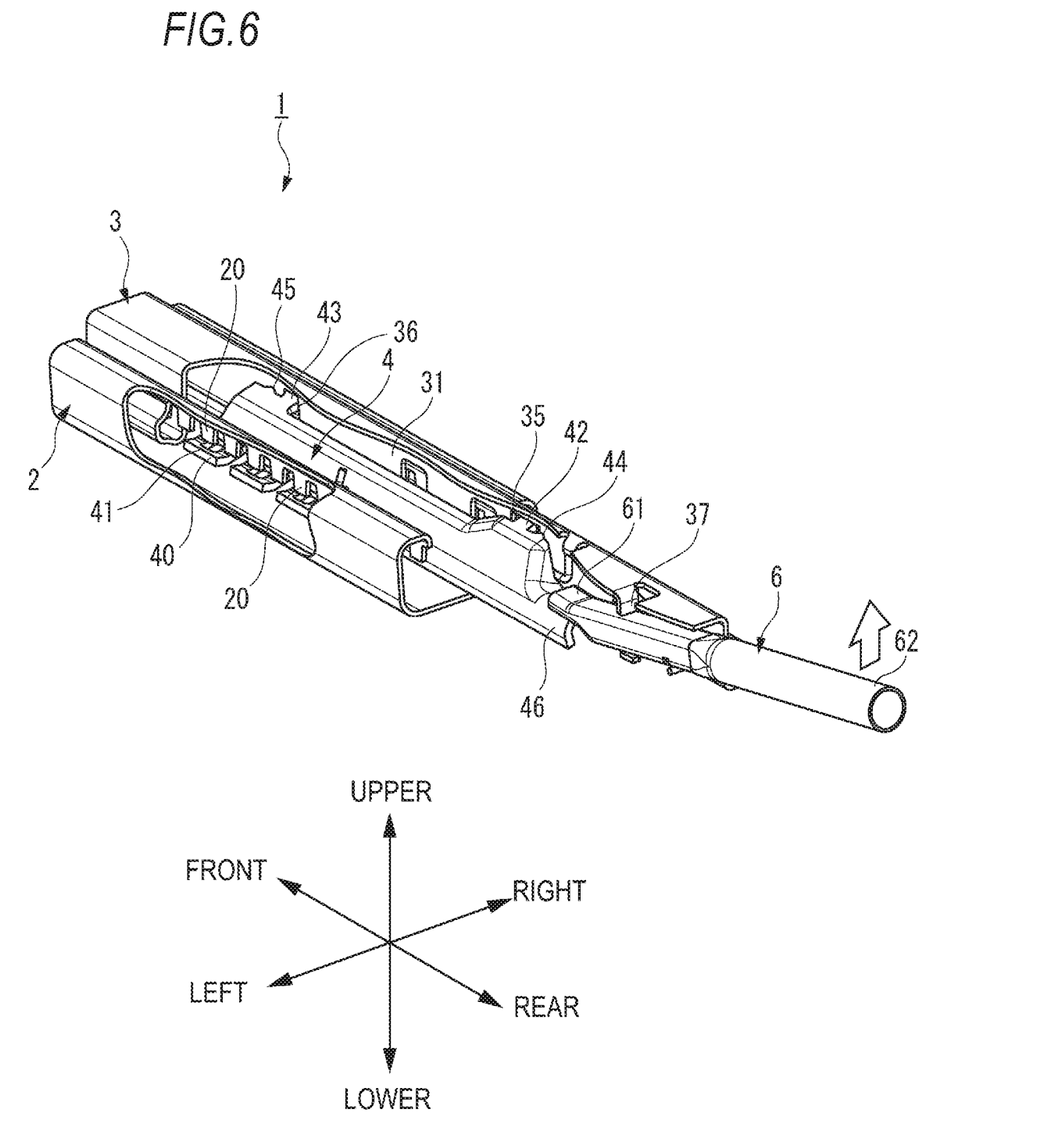
FIG. 6 is a view illustrating the vehicle seat sliding device in a state where lock between an upper rail and a lower rail is released.

Next, the description will be given below about a case where the state of the slide device 1 is shifted from the locked state illustrated in FIG. 3 to a state where the engagement between the locking part 40 and the engaging protrusion part 20 is released as illustrated in FIG. 6 (hereinafter, referred to as an unlock state).

In the locked state illustrated in FIG. 3, an operator moves the rear end part 62 of the operation handle 6 upward, and the moment of the force with the handle abutting part 37 as a fulcrum is generated in the front end part 61 of the operation handle 6. At that time, the front end part 61 of the operation handle 6 presses the rear end part 46 of the lock lever 4 downward, so that the lock lever 4 rotates such that the locking part 40 moves downward. As a result, as illustrated in FIG. 6, the engagement between the locking part 40 and the engaging protrusion part 20 is released.

While the lock lever 4 is being rotated by the operation handle 6, the first engaging part 42 is engaged by the first through hole 35, and the second engaging part 43 is engaged by the second through hole 36. Particularly, the first engaging part 42 abuts on an upper inner wall surface 35b (see FIGS. 4A and 4B) of the first through hole 35 and is engaged by the first through hole 35. The second engaging part 43 abuts on the tilted inner wall surfaces 36a (see FIGS. 4A and 4B) on both sides of the second through hole 36 and is engaged by the second through hole 36.

Thus, the lock lever 4 is rotated in the state of being supported by the first through hole 35 and the second through hole 36 of the upper rail 3, and thus it is prevented that a rotational shaft Ax (see FIGS. 4A and 4B) which extends in the front and rear direction of the lock lever 4 is deviated largely during the rotation of the lock lever 4. Thus, it is not necessary to additionally provide a support mechanism such as a hinge pin for rotatably supporting the lock lever 4 in the slide device 1. Therefore, it is possible to reduce the number of the components necessary for the slide device 1. Further, when the number of the component is reduced as above, a producing process required for the production of the slide device 1 can be reduced, and the producing cost of the slide device 1 can be reduced.

Further, in the locked state illustrated in FIG. 3, the first engaging part 42 is biased downward by the spring 5, and the second engaging part 43 is biased upward by the spring 5. For this reason, it is suppressed that when the lock lever 4 is rotated about the rotational shaft Ax, the lock lever 4 is rotated about the rotational shaft extending in the right and left direction. Thus, the lock lever 4 can be smoothly rotated about the rotational shaft Ax.

As illustrated in FIGS. 4A and 4B, the position of the lower surface of the first engaging part 42 in the vertical direction is substantially the same as the position of the upper surface of the second engaging part 43. That is, the lower surface of the first engaging part 42 and the upper surface of the second engaging part are arranged on the rotational shaft Ax. For this reason, the rotational shaft Ax of the lock lever 4 is substantially parallel to the longitudinal direction (front and rear direction) of the lock lever 4, and thus, the lock lever 4 can be rotated smoothly.

Hereinbefore, the description has been given about the embodiment of the invention, but the technical scope of the invention is not to be interpreted restrictively by the description of this embodiment. This embodiment is merely given as examples, and a person skilled in the art would understand that various modifications can be made to the embodiment within the scope of the invention described in the claims. Thus, the technical scope of the invention is to be defined on the basis of the scope of the invention described in the claims and an equivalent scope thereof.

This application appropriately incorporates the contents disclosed in Japanese Patent Application No. 2015-126599 filed on Jun. 24, 2015.

The invention claimed is:

1. A vehicle seat sliding device comprising:
   a lower rail, which is fixed to a vehicle body and has an engaging protrusion part;
   an upper rail, which is supported to be slidable with respect to the lower rail and is fixed to a seat;
   a lock lever, which has a locking part configured to be engaged with the engaging protrusion part and locks the upper rail in the lower rail in a state where the locking part is engaged with the engaging protrusion part;
   a biasing member, which is supported by the upper rail and biases the lock lever; and
   an operation handle, which is configured such that the lock lever is rotated to release engagement between the locking part and the engaging protrusion part,
   wherein a first through hole and a second through hole, which are separated from each other in a longitudinal direction of the upper rail, are formed in the upper rail,
   wherein the lock lever further has a first engaging part, which abuts on an inner wall surface of the first through hole, and a second engaging part, which abuts on an inner wall surface of the second through hole,
   wherein at least while the lock lever is being rotated by the operation handle, the first engaging part is engaged by the first through hole, and the second engaging part is engaged by the second through hole, and
   wherein at least in a state where the locking part is engaged with the engaging protrusion part, the biasing member biases the first engaging part downward such that the first engaging part abuts on the inner wall surface of the first through hole, and biases the second engaging part upward such that the second engaging part abuts on the inner wall surface of the second through hole.

2. The slide device according to claim 1, wherein the biasing member is formed by a single spring.

3. The slide device according to claim 2, wherein the biasing member supports the operation handle so as to bias the operation handle.

4. The slide device according to claim 1, wherein at least one of the first through hole and the second through hole is a taper hole which has a tilted inner wall surface tilted with respect to a vertical direction orthogonal to the longitudinal direction.

5. The slide device according to claim 1, wherein a position of a lower surface of the first engaging part in a vertical direction orthogonal to the longitudinal direction of the upper rail is substantially the same as a position of an upper surface of the second engaging part.

6. The slide device according to claim 1, wherein the lock lever further has
a first protrusion part, which is formed in a vicinity of the first engaging part and abuts on the upper rail, and
a second protrusion part, which is formed in a vicinity of the second engaging part and abuts on the upper rail.

\* \* \* \* \*